June 8, 1965 B. NELSON 3,188,032
BATTERY CARRIER
Filed April 15, 1963
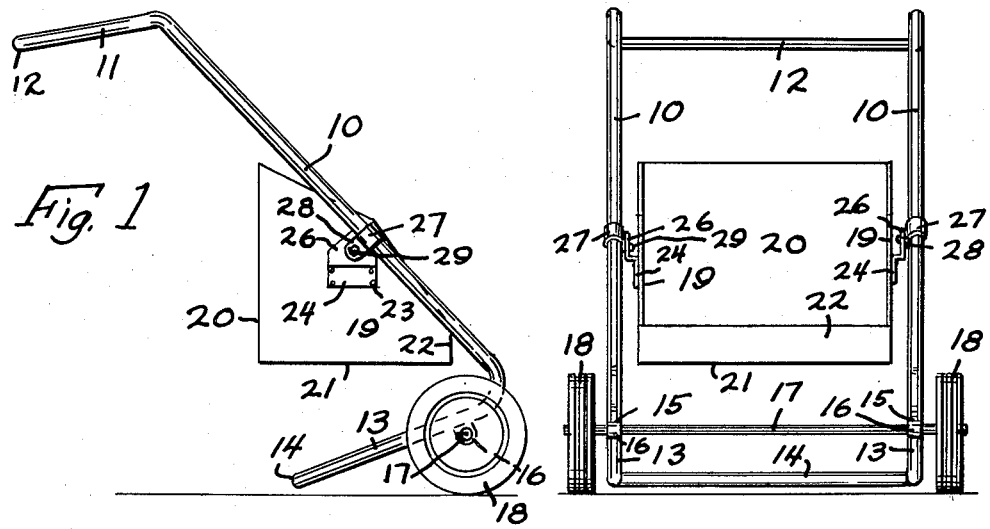
Fig. 1
Fig. 2
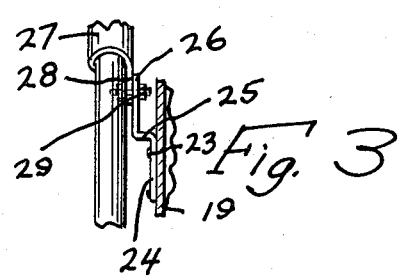
Fig. 3
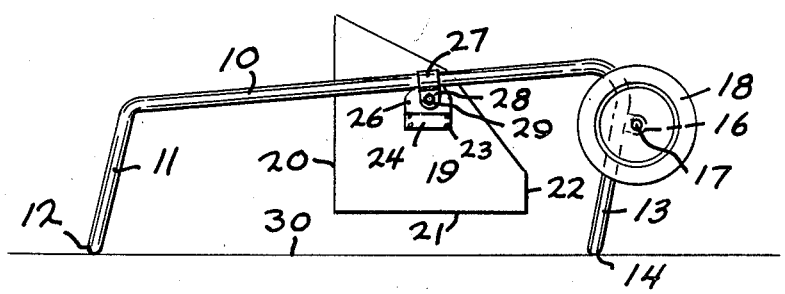
Fig. 4
INVENTOR.
Benjamin Nelson
BY
Sam J. Slotsky
ATTORNEY United States Patent Office 3,188,032
Patented June 8, 1965

3,188,032
BATTERY CARRIER
Benjamin Nelson, Ida Grove, Iowa
Filed Apr. 15, 1963, Ser. No. 273,140
1 Claim. (Cl. 248—130)

My invention relates to a battery carrier.

An object of my invention is to provide a battery carrier which is portable.

A further object of my invention is to provide a battery carrier which can be placed in a stationary position and yet supporting the battery or other members.

A further object of my invention is to provide a carrier unit which will suitably pivot on the framework of the carrier to thereby constantly remain in a level condition at all times.

A further object of my invention it to provide a battery carrier which can be tipped to a substantially horizontal position, whereby the battery carrier will still be maintained in a level position, and whereby the complete carrier can be transported in such position, etc.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of the battery carrier,
FIGURE 2 is a forward elevation of FIGURE 1,
FIGURE 3 is an enlarged detail, and
FIGURE 4 is a side elevation of the carrier in its horizonal position.

In describing my invention I have used the character 10 to indicate tubular members, which tubular members extend into the portions 11, extending angularly as shown from the portions 10, the portions 11 extending into the integral transverse portion 12. I have further used the character 13 to indicate further integral portions extending angularly from the portions 10, the character 14 indicating a further transverse portion extending from the portions 13.

Attached as at 15 to the members 10 are the members 16 to which is secured a transverse lengthened shaft 17 upon which are journalled the side wheels 18.

The character 19 indicates side walls of a battery carrier unit which can carry one or more batteries or any other device, the character 20 indicating a rear wall, the character 21 a bottom wall, and a character 22 a forward wall, this structure allowing for the reception of batteries or the like. Attached to the side walls 19 as at 23 are the plates 24 which extend into the integral portions 25 and the vertical portions 26.

Secured to the members 10 are the cylindrical sleeves 27 which extend into the vertically positioned portions 28, and received through the portions 28 and the portions 26 are the bolts 29, these bolts permitting a free pivoting action of the carrier 20, 21, etc.

It will now be observed from the foregoing description that batteries in the carrier unit 20, 21, etc. can be readily transported from place to place with the unit being approximately in the position shown in FIGURE 1, and with the transverse member 14 being slightly off the floor level, whereby the unit can be wheeled around to any desired location or place, and then the members 11 which serve as the handles can be released, with the member 14 resting on the floor surface, whereby the unit will be stationary and the batteries can be removed, etc.

It will also be noted that during such transporting operation, regardless of the angle of the floor, or other humps and the like, the unit 20, 21, etc. will remain in a constantly level position, which is relatively important in batteries for instance, wherein the level of the fluid must be maintained horizontal.

When it is desired to transport the unit in a truck or other vehicle, the unit can be placed in the position shown in FIGURE 4, and the pivoting carrier unit will still remain in the level position, the character 30 indicating the floor of the vehicle.

It will thus be noted that the device of my invention will provide the advantages mentioned in the objects of my invention, and with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A battery carrier comprising a framework, a pair of wheels journalled to said framework, said framework including laterally spaced support members, a carrier unit including side walls, a rear wall and a bottom wall, said carrier uint being freely pivoted with respect to said laterally spaced support members whereby said carrier unit will constantly remain in a horizontal position regardless of the position of said laterally spaced support members, said laterally spaced support members including vertical flange members attached thereto, said carrier unit including hanger elements attached to its side walls, bolts passing through said hanger elements and said flange members, said laterally spaced support members including integral handle portions angularly inclined with respect to said laterally spaced support members, and further including further integral portions angularly inclined with respect to said laterally spaced support members, said angularly inclined portions being positioned at either ends of said framework, and being attached to the opposite ends of said laterally spaced support members, and extending outwardly therefrom in the same direction.

References Cited by the Examiner
UNITED STATES PATENTS 1,255,484  2/18  Stephens _____ 214—384
1,990,398  2/35  Beddingfield _____ 312—118
2,564,170  8/51  Nusbaum et al. _____ 340—366

CLAUDE A. LE ROY, *Primary Examiner.*